(12) United States Patent
Lundstrum et al.

(10) Patent No.: US 9,195,497 B2
(45) Date of Patent: Nov. 24, 2015

(54) MICROCONTROLLER WITH CONTEXT SWITCH

(71) Applicant: Microchip Technology Incorporated, Chandler, AZ (US)

(72) Inventors: Zeke Lundstrum, Chandler, AZ (US); Fanie Duvenhage, Phoenix, AZ (US); Sean Steedman, Phoenix, AZ (US); Kevin Lee Kilzer, Chandler, AZ (US); Joseph Julicher, Maricopa, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 429 days.

(21) Appl. No.: 13/830,377

(22) Filed: Mar. 14, 2013

(65) Prior Publication Data

US 2013/0254476 A1    Sep. 26, 2013

Related U.S. Application Data

(60) Provisional application No. 61/613,802, filed on Mar. 21, 2012.

(51) Int. Cl.
*G06F 9/30* (2006.01)
*G06F 9/48* (2006.01)
*G06F 9/38* (2006.01)

(52) U.S. Cl.
CPC ............ *G06F 9/4812* (2013.01); *G06F 9/3012* (2013.01); *G06F 9/30101* (2013.01); *G06F 9/30123* (2013.01); *G06F 9/30138* (2013.01)

(58) Field of Classification Search
None
See application file for complete search history.

(56) References Cited

U.S. PATENT DOCUMENTS

2009/0144481 A1 *  6/2009  Julicher et al. ..................... 711/5
2009/0144511 A1    6/2009  Julicher et al. ................. 711/154

FOREIGN PATENT DOCUMENTS

EP          0441054 A1   8/1991   ............. G06F 9/30
WO     2004/046925 A1   6/2004   ............. G06F 9/46

OTHER PUBLICATIONS

International Search Report and Written Opinion, Application No. PCT/US2013/032876, 9 pages, Jul. 23, 2013.

* cited by examiner

*Primary Examiner* — Scott Sun
(74) *Attorney, Agent, or Firm* — Slayden Grubert Beard PLLC (57) ABSTRACT

A microprocessor or microcontroller device may have a central processing unit (CPU), a data memory coupled with the CPU, wherein the data memory is divided into a plurality of memory banks, wherein a bank select register determines which memory bank is currently coupled with the CPU. Furthermore, a first and second set of special function registers are provided, wherein upon occurrence of a context switch either the first or the second set of special function register are selected as active context registers for the CPU and the respective other set of special function registers are selected as inactive context registers, wherein at least some of the registers of the active context registers are memory mapped to more than two memory banks of the data memory and wherein all registers of the inactive context registers are memory mapped to at least one memory location within the data memory.

22 Claims, 7 Drawing Sheets

| BSR<2:0> [2] → | 000 | 001 | 010 | 011 |
|---|---|---|---|---|
| File Address | | 20h | 40h | 60h |
| 00h | INDF [1] | INDF [1] | INDF [1] | INDF [1] |
| 01h | TMR0 | EECON | TMR0 | I_W [4,5] |
| 02h | PCL | PCL | PCL | PCL |
| 03h | STATUS [3,4] | STATUS [3,4] | STATUS [3,4] | STATUS [3,4] |
| 04h | FSR [3,4] | FSR [3,4] | FSR [3,4] | FSR [3,4] |
| 05h | OSCCAL | EEDATA | OSCCAL | INTIE_REG |
| 06h | PORTA | EEADR | PORTA | I_STATUS [4,5] |
| 07h | PORTB | CM1CON0 | PORTB | I_FSR [4,5] |
| 08h | PORTC | CM2CON0 | PORTC | I_BSR [4,5] |
| 09h | ADCON0 | VRCON | ADCON0 | OPACON |
| 0Ah | ADRES | ANSEL | ADRES | ANSEL |
| 0Bh | INTCON | INTCON | INTCON | INTCON |
| 0Ch – 0Fh | General Purpose Registers | 2Fh | 4Fh | 6Fh |
| 10h – 1Fh | General Purpose Registers | 30h General Purpose Registers 3Fh | 50h General Purpose Registers 5Fh | 70h General Purpose Registers 7Fh |
| | Bank 0 | Bank 1 | Bank 2 | Bank 3 |

Addresses map back to addresses in Bank 0.

*Figure 5*

TABLE 3-2: SPECIAL FUNCTION REGISTER SUMMARY – PIC16F527

| Address | Name | Bit 7 | Bit 6 | Bit 5 | Bit 4 | Bit 3 | Bit 2 | Bit 1 | Bit 0 | Value on POR/BOR |
|---|---|---|---|---|---|---|---|---|---|---|
| Bank 0 | | | | | | | | | | |
| N/A | W(2) | Working Register (W) | | | | | | | | xxxx xxxx |
| N/A | TRIS | I/O Control Registers (TRISA, TRISB, TRISC) | | | | | | | | 1111 1111 |
| N/A | OPTION | Contains control bits to configure Timer0 and Timer0/WDT prescaler | | | | | | | | 1111 1111 |
| N/A | BSR(2) | — | — | — | — | — | BSR2 | BSR1 | BSR0 | ---- -000 |
| 00h | INDF | Uses contents of FSR to address data memory (not a physical register) | | | | | | | | xxxx xxxx |
| 01h | TMR0 | Timer0 Module Register | | | | | | | | xxxx xxxx |
| 02h | PCL(1) | Low order 8 bits of PC | | | | | | | | 1111 1111 |
| 03h | STATUS(2) | — | PA1 | PA0 | TO(4) | PD(4) | Z | DC | C | -001 1xxx |
| 04h | FSR(2) | FSR7 | Indirect data memory address pointer | | | | | | | 0xxx xxxx |
| 05h | OSCCAL | CAL6 | CAL5 | CAL4 | CAL3 | CAL2 | CAL1 | CAL0 | — | 1111 111- |
| 06h | PORTA | — | — | RA5 | RA4 | RA3 | RA2 | RA1 | RA0 | --xx xxxx |
| 07h | PORTB | RB7 | RB6 | RB5 | RB4 | — | — | — | — | xxxx ---- |
| 08h | PORTC | RC7 | RC6 | RC5 | RC4 | RC3 | RC2 | RC1 | RC0 | xxxx xxxx |
| 09h | ADCON0 | ADCS1 | ADCS0 | CHS3 | CHS2 | CHS1 | CHS0 | GO/DONE | ADON | 1111 1100 |
| 0Ah | ADRES | ADC Conversion Result | | | | | | | | xxxx xxxx |
| 0Bh | INTCON | ADIF | ADIE | T0IF | T0IE | — | — | — | BIE | 0000 ---0 |
| Bank 1 | | | | | | | | | | |
| N/A | W(2) | Working Register (W) | | | | | | | | xxxx xxxx |
| N/A | TRIS | I/O Control Registers (TRISA, TRISB, TRISC) | | | | | | | | 1111 1111 |
| N/A | OPTION | Contains control bits to configure Timer0 and Timer0/WDT prescaler | | | | | | | | 1111 1111 |
| N/A | BSR(2) | — | — | — | — | — | BSR2 | BSR1 | BSR0 | ---- -000 |
| 20h | INDF | Uses contents of FSR to address data memory (not a physical register) | | | | | | | | xxxx xxxx |
| 21h | EECON | — | — | — | FREE | WRERR | WREN | WR | RD | xxx0 0000 |
| 22h | PCL(1) | Low order 8 bits of PC | | | | | | | | 1111 1111 |
| 23h | STATUS(2) | — | PA1 | PA0 | TO(4) | PD(4) | Z | DC | C | -001 1xxx |
| 24h | FSR(2) | FSR7 | Indirect data memory address pointer | | | | | | | 0xxx xxxx |
| 25h | EEDATA | SELF READ/WRITE DATA | | | | | | | | xxxx xxxx |
| 26h | EEADR | — | — | SELF READ/WRITE ADDRESS | | | | | | --xx xxxx |
| 27h | CM1CON0 | C1OUT | C1OUTEN | C1POL | C1T0CS | C1ON | C1NREF | C1PREF | C1WU | 1111 1111 |
| 28h | CM2CON0 | C2OUT | C2OUTEN | C2POL | CP2REF2 | C2ON | C2NREF | C2PREF1 | C2WU | 1111 1111 |
| 29h | VRCON | VREN | VROE | VRR | — | VR3 | VR2 | VR1 | VR0 | 000- 1111 |
| 2Ah | ANSEL | ANS7 | ANS6 | ANS5 | ANS4 | ANS3 | ANS2 | ANS1 | ANS0 | 1111 1111 |
| 2Bh | INTCON | ADIF | ADIE | T0IF | T0IE | — | — | — | BIE | 0000 ---0 |

Legend: x = unknown, u = unchanged, -- = unimplemented, read as '0' (if applicable). Shaded cells = unimplemented or unused.
Note 1: The upper byte of the Program Counter is not directly accessible. See Section 3.3.4 for an explanation of how to access these bits.
 2: Registers are implmented as two physical registers. When executing from within an ISR, a second register is use at the same logical location. Both registers are persistent. See Section 3.3.2.
 3: These registers show the contents of the registers in the other context; ISR or main line code.
 4: These bits do not context switch when vectoring to the ISR.

*Figure 6*

| Address | Name | Bit 7 | Bit 6 | Bit 5 | Bit 4 | Bit 3 | Bit 2 | Bit 1 | Bit 0 | Value on POR/BOR |
|---|---|---|---|---|---|---|---|---|---|---|
| Bank 2 | | | | | | | | | | |
| N/A | W[2] | Working Register (W) | | | | | | | | xxxx xxxx |
| N/A | TRIS | I/O Control Registers (TRISA, TRISB, TRISC) | | | | | | | | 1111 1111 |
| N/A | OPTION | Contains control bits to configure Timer0 and Timer0/WDT prescaler | | | | | | | | 1111 1111 |
| N/A | BSR[2] | — | — | — | — | — | BSR2 | BSR1 | BSR0 | ---- -000 |
| 40h | INDF | Uses contents of FSR to address data memory (not a physical register) | | | | | | | | xxxx xxxx |
| 41h | TMR0 | Timer0 Module Register | | | | | | | | xxxx xxxx |
| 42h | PCL[1] | Low order 8 bits of PC | | | | | | | | 1111 1111 |
| 43h | STATUS[2] | — | PA1 | PA0 | TO[4] | PD[4] | Z | DC | C | -001 1xxx |
| 44h | FSR[2] | FSR7 | Indirect data memory address pointer | | | | | | | 0xxx xxxx |
| 45h | OSCCAL | CAL6 | CAL5 | CAL4 | CAL3 | CAL2 | CAL1 | CAL0 | — | 1111 111- |
| 46h | PORTA | — | — | RA5 | RA4 | RA3 | RA2 | RA1 | RA0 | --xx xxxx |
| 47h | PORTB | RB7 | RB6 | RB5 | RB4 | — | — | — | — | xxxx ---- |
| 48h | PORTC | RC7 | RC6 | RC5 | RC4 | RC3 | RC2 | RC1 | RC0 | xxxx xxxx |
| 49h | ADCON0 | ADCS1 | ADCS0 | CHS3 | CHS2 | CHS1 | CHS0 | GO/DONE | ADON | 1111 1100 |
| 4Ah | ADRES | ADC Conversion Result | | | | | | | | xxxx xxxx |
| 4Bh | INTCON | ADIF | ADIE | T0IF | T0IE | — | — | — | BIE | 0000 ---0 |
| Bank 3 | | | | | | | | | | |
| N/A | W[2] | Working Register (W) | | | | | | | | xxxx xxxx |
| N/A | TRIS | I/O Control Registers (TRISA, TRISB, TRISC) | | | | | | | | 1111 1111 |
| N/A | OPTION | Contains control bits to configure Timer0 and Timer0/WDT prescaler | | | | | | | | 1111 1111 |
| N/A | BSR[2] | — | — | — | — | — | BSR2 | BSR1 | BSR0 | ---- -000 |
| 60h | INDF | Uses contents of FSR to address data memory (not a physical register) | | | | | | | | xxxx xxxx |
| 61h | I_W[3] | Interrupt Working Register. (Addressed also as W register when within ISR) | | | | | | | | xxxx xxxx |
| 62h | PCL[1] | Low order 8 bits of PC | | | | | | | | 1111 1111 |
| 63h | STATUS[2] | — | PA1 | PA0 | TO[4] | PD[4] | Z | DC | C | -001 1xxx |
| 64h | FSR[2] | FSR7 | Indirect data memory address pointer | | | | | | | 0xxx xxxx |
| 65h | INTIE_REG | ADIE | CWIE | T0IE | RAIE | — | — | — | WUR | 0000 ---0 |
| 66h | I_STATUS[3] | — | PA1 | PA0 | TO[4] | PD[4] | Z | DC | C | -xxx xxxx |
| 67h | I_FSR[3] | FSR7 | Indirect data memory address pointer | | | | | | | 0xxx xxxx |
| 68h | I_BSR[3] | — | — | — | — | — | BSR2 | BSR1 | BSR0 | ---- -0xx |
| 69h | OPACON | — | — | — | — | — | — | OPA2ON | OPA1ON | ---- --00 |
| 6Bh | INTCON | ADIF | CWIF | T0IF | RAIF | — | — | — | GIE | 0000 ---0 |

Legend: x = unknown, u = unchanged, — = unimplemented, read as '0' (if applicable). Shaded cells = unimplemented or unused Note 1: The upper byte of the Program Counter is not directly accessible. See Section 3.3.4 for an explanation of how to access these bits.
2: Registers are implemented as two physical registers. When executing from within an ISR, a second register is use at the same logical location. Both registers are persistent. See Section 3.3.2.
3: These registers show the contents of the registers in the other context; ISR or main line code.
4: These bits do not context switch when vectoring to the ISR

*Figure 7*

TABLE 3-3: INTERRUPT PRIORITIES

| | In Sleep | GIE | WUR |
|---|---|---|---|
| Vector or Wake Up and Vector | X | 1 | 0 |
| Wake Up Reset | 1 | X | 1 |
| Wake Up Inline | 1 | 0 | 0 |
| Watchdog Wake Up Inline | 1 | X | 0 |
| Watchdog Wake Up Reset | 1 | X | 1 |

*Figure 8*

MICROCONTROLLER WITH CONTEXT SWITCH

CROSS-REFERENCE TO RELATED APPLICATIONS

This application claims the benefit of U.S. Provisional Application No. 61/613,802 filed on Mar. 21, 2012, which is incorporated herein in its entirety.

TECHNICAL FIELD

The present disclosure relates to a microcontroller, in particular a microcontroller with automatic context switching capabilities.

BACKGROUND

Microcontrollers generally are systems on a single chip and comprise a microcontroller core or central processing unit and a plurality of peripheral components. A wide variety of such microcontrollers exist having 8-bit, 16-bit and 32-bit architecture. Existing microcontrollers such as 8-bit microcontrollers manufactured by the Applicant Microchip Technology Inc. provide for a flexible architecture wherein a plurality of families are available, each family having a different complexity. Such microcontrollers may for example comprise a Harvard architecture in which program and data memories are separated. Microcontrollers of this type may further comprise a specific banking system that allows access to the data memory without a complex decoding circuitry. Generally, the data memory is divided in a plurality of banks and a bank select register defines which of the banks is currently selected and accessible. To access other banks, the bank select register has to be re-programmed. Even though such a banking scheme only allows access to a single defined memory bank, these controllers may include instructions that force a switch to a predefined bank. This provides for improved and powerful performance despite the general access limitations.

According to a product palette, different families of microcontrollers in an 8-bit family can be provided as mentioned above. For example, a baseline family might provide for only essential functionalities which allows manufacture of such devices at very low cost. For example, such a baseline product may not support interrupts wherein more advanced families may have these functionalities. Interrupt functionality can add significant circuitry which does not allow to manufacture such devices at very low costs.

As mentioned above, many microcontroller designs, in particular 8-bit microcontrollers, have a reduced functionality and therefore simplified architecture to save valuable silicon real estate and allow for a reduced chip size and thus for a higher number of chips per wafer. For example, according to Applicant Microchip Technology Inc.'s product line, many of so-called baseline 8-bit microcontroller's code execution is limited by lack of interrupt functions.

Figure 1:
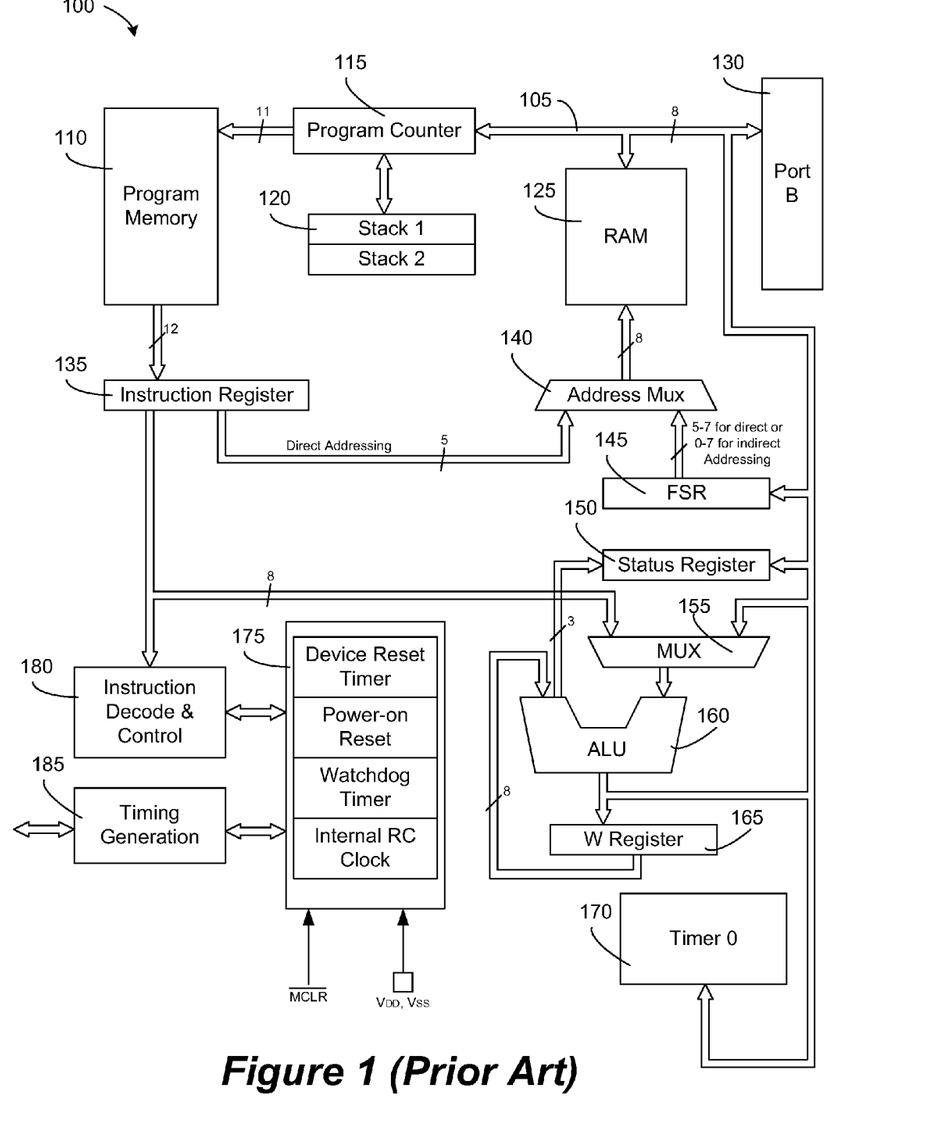
FIG. 1 shows a block diagram of a conventional microcontroller.

FIG. 1, shows a simplified block diagram of such a conventional microcontroller with a data memory that can be accessed with a banking mechanism. A program memory 110 stores a plurality of instructions forming an executable program. Program counter 115 may be designed to have for example 11 bits for addressing a 2 k linear program memory. A stack 120 may be provided to store program counter values when subroutines are executed. The shown exemplary microcontroller is an 8-bit Harvard-type microcontroller that operates with 12-bit instruction words stored in program memory 110. Thus, a central 8-bit data bus 105 may be used to couple various functional elements within the microcontroller, such as for example timer unit 0 and external port B 130. The data memory 125 is coupled with this bus 105 and receives for example an 8-bit address from address multiplexer 140. For direct addressing, address multiplexer 140 combines an address from address data supplied by the instruction register 135 and address data supplied by special function register 145. In direct addressing mode, the instruction register 135, thus, supplies the lower 5 bits and the special function register 145 the upper 3 bits. Thus, according to an embodiment, special function register 145 operates as a bank select register capable of selecting one of 8 different memory banks. In indirect addressing, special function register 145 provides for a complete address with all bits 0-7. Indirect addressing is implemented by accessing special function register INDF which is a virtual register and therefore not a physically implemented. Any read or write access to this register INDF forces that an indirect access is applied to the data memory 125 via special function register 145. Thus, instead of reading or writing register INDF, an indirect data memory access is performed.

According to this type of architecture, instruction register 135 receives an instruction directly from program memory 110 and is coupled with an instruction decode & control unit 180, for example, through another internal 8 bit bus. Instruction decode & control unit 180 is furthermore coupled with certain internal function provided by unit 175. For example, this functional unit 175 may include a device reset timer, a power-on reset, a watchdog timer, an internal RC clock, etc. Other functions can be integrated and/or certain functions may be omitted. Timing generation unit 185 may provide for internal timing signals and can also be coupled with unit 175. The conventional 8-bit microcontroller core shown in FIG. 1 has an arithmetic logic unit 160 (ALU) coupled with a status register 150. The ALU 160 is further coupled with a working register 165 and receives data from the instruction register 135 and the 8-bit data bus through multiplexer 155 on one hand and on the other hand from working register 165. FIG. 1, thus, merely shows some essential structure of a so-called baseline microcontroller core.

Figure 2:
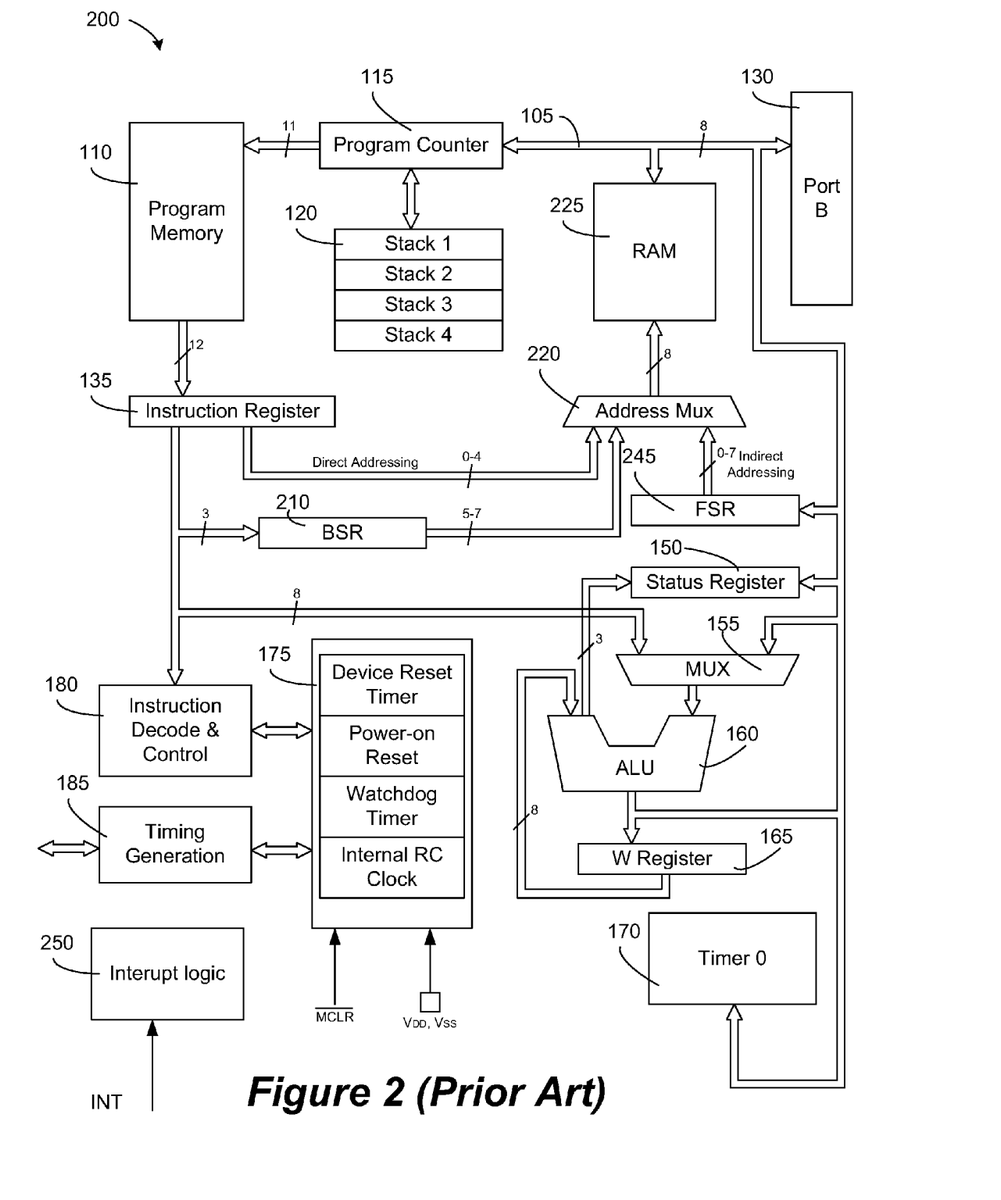
FIG. 2 shows a block diagram of another conventional microcontroller.

FIG. 2 shows an example of another block diagram of a microcontroller core that provides for more functionality. Generally, similar elements carry the same reference symbol. The data memory RAM 225 shown in FIG. 2 can be identical to the memory as shown in FIG. 1. However, a different reference symbol is used to indicate that this RAM 225 is differently mapped as will be explained below in more detail. This data memory now comprises a linear memory block consisting of a plurality of sequential memory banks to which no special function registers are mapped. An additional bank select register (BSR) 210 is provided wherein this register is accessible through a dedicated instruction and therefore may not be memory mapped. The content of this register 210 provides for the upper 3 bits of an address provided by address multiplexer 220 which receives the lower 5 bits from instruction register 135. The special function register FSR 145 may now be an 8-bit register which can be used for indirect addressing of the entire linear data memory independent of the currently selected memory bank. In other embodiments, this register can be limited to access the upper 4 banks that form the linear data memory by setting bit 7 permanently to "1". However, this register does not provide for the bank select function per se anymore. Bank selection is effected only by writing a respective bank number into the non-memory mapped bank select register 210. Thus, even when a memory bank within the linear memory block is selected, the dedicated instruction allows for change to any other memory bank. Other internal structures of low cost microcontroller cores are possible and can be combined with the specific embodiments disclosed in the various embodiments as will be explained in more detail below.

As mentioned above, many low cost microcontroller cores do not provide for an interrupt functionality due to the increase in core logic. A simple interrupt logic 250 can be added to the architectures mentioned above as shown in FIG. 2, for example a single interrupt input INT can be provided which may initiate an interrupt from various sources, wherein software has to handle identification and management of interrupt related tasks. If such a simple interrupt logic 250 is implemented, then an interrupt service routine code must share common special function registers with main line code. Thus, certain registers, such as register 245, 165 and 150 need to be manually saved when entering an interrupt routine. Certain microcontrollers, for example, Applicant's microcontroller series PIC16F1xxx provide for an automatic save and restore function of context registers using so-called shadow registers. The shadow registers are special function registers merely for the purpose to save the current context. They are overwritten each time an interrupt is initiated and their content is written back to the respective context registers upon return from the interrupt routine. However, while this is an improvement, when adding interrupt capability, there exists a need for an even more improved automatic context switching that prevents the need to manually store and restore those registers and allows for further use of the saved context.

SUMMARY

According to an embodiment, a microprocessor or microcontroller device may comprise a central processing unit (CPU); a data memory coupled with the CPU, wherein the data memory is divided into a plurality of memory banks, wherein a bank select register determines which memory bank is currently coupled with the CPU; and a first set of special function registers and a second set of special function registers, wherein upon occurrence of a context switch either the first or the second set of special function register are selected as active context registers for the CPU and the respective other set of special function registers are selected as inactive context registers, wherein at least some of the registers of the active context registers are memory mapped to more than two memory banks of the data memory and wherein all registers of the inactive context registers are memory mapped to at least one memory location within the data memory.

According to a further embodiment, all registers of the inactive context registers can be memory mapped to only one memory bank of the plurality of memory banks. According to a further embodiment, at least some of the registers of the active context registers can be memory mapped to all memory banks of the data memory. According to a further embodiment, the context register may comprise a working register, a status register, a file select register for defining an indirect address and a bank select register. According to a further embodiment, only the status register and the file select register of the active context registers may be memory mapped to all memory banks of the data memory and the working register and the bank select register are non-memory mapped registers. According to a further embodiment, the inactive context registers can be memory mapped to the last memory bank of the data memory. According to a further embodiment, the device may further comprise an interrupt unit coupled with the CPU, wherein the context switch is induced by an interrupt. According to a further embodiment, the context switch can be software induced. According to a further embodiment, the device may comprise four memory banks. According to a further embodiment, the inactive context registers can be memory mapped only into the fourth bank.

According to another embodiment, a method of operating a microprocessor or microcontroller device comprising a central processing unit (CPU); a data memory coupled with the CPU, wherein the data memory is divided into a plurality of memory banks; a first and second set of special function registers wherein either the first or the second set of special function registers forms an active context and the respective other set an inactive context, may comprise the steps of: selecting either the first or the second set of registers as an active context and the respective other set of registers as an inactive context, wherein at least some of the registers of the active context registers are memory mapped to more than two memory banks of the data memory and wherein all registers of the inactive context registers are memory mapped to at least one memory location within the data memory; upon occurrence of a context switch, switching between the first and second set of registers as active and inactive context, respectively.

According to a further embodiment of the method, all registers of the inactive context registers can be memory mapped to only one memory bank of the plurality of memory banks. According to a further embodiment of the method, the method may further comprise inducing the context switch by an interrupt. According to a further embodiment of the method, the context switch can be software induced. According to a further embodiment of the method, the device may comprise four memory banks. According to a further embodiment of the method, the inactive context registers can be memory mapped only into the fourth bank. According to a further embodiment of the method, at least some of the registers of the active context can be memory mapped to all memory banks of the data memory. According to a further embodiment of the method, the context register may comprise a working register, a status register, a file select register for defining an indirect address and a bank select register. According to a further embodiment of the method, only the status register and the file select register of the active context registers are memory mapped to all memory banks of the data memory and the working register and the bank select register are non-memory mapped registers. According to a further embodiment of the method, the inactive context registers are memory mapped to the last memory bank of the data memory. According to a further embodiment of the method, the method may further comprise accessing the registers of the inactive context by selecting the respective memory bank through the active context and accessing the inactive context registers. According to a further embodiment of the method, the method may comprise generating a plurality of interrupts, wherein upon occurrence of an interrupt, a context switch takes place, wherein an interrupt routine is executed and wherein the interrupt routine uses the values stored in the selected register set during a previous execution of the interrupt routine.

BRIEF DESCRIPTION OF THE DRAWINGS

FIGS. 6 and 7 shows a detail special function summary table, and

DETAILED DESCRIPTION

Baseline CPU's in the above mentioned microcontrollers often do not have interrupt capabilities. Adding interrupts to the baseline CPU presents specific drawbacks and limitations. The context switching according to various embodiments overcomes many of those drawbacks.

When a device with interrupt capability vectors to its Interrupt Service Routine (ISR) the values, or context, of various registers must be saved and restored to allow the program to resume from where it left off upon return to mainline code. Other register must be re-initialized each time the device vectors to the ISR. Contexts switching according to various embodiments allows a copy of these critical registers to be maintained for each mainline and ISR execution code, and swapped for use. According to various embodiments, the addition of a circular buffers to context registers is provided that allows contained values to swap on entry and exit of ISR.

Figure 3:
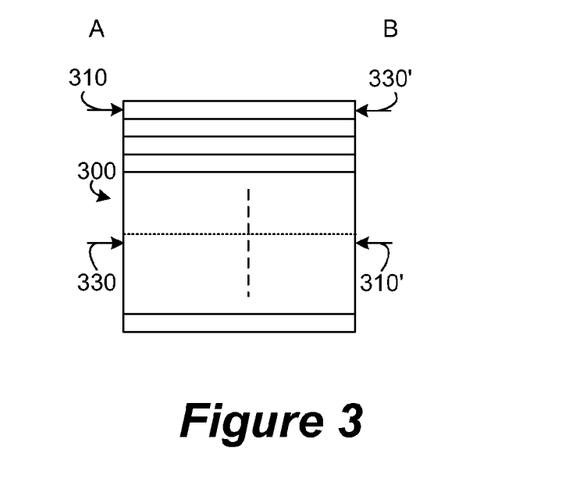
FIG. 3 shows an embodiment of a swappable shadow register set.
Figure 4:
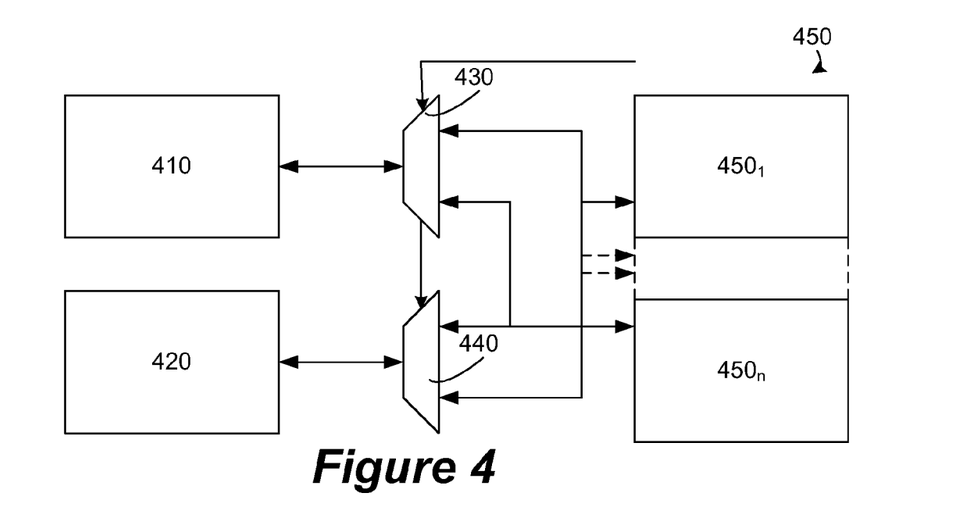
FIG. 4 shows another embodiment of a circular buffer for providing a dual register set.

According to various embodiments, as shown for example in FIG. 3 or FIG. 4 a context switching mechanism can be added to a basic processor logic to provide for interrupt capabilities and associated context switch. Thus, an architecture as shown in FIG. 1 or 2 can be improved by providing an additional set of registers wherein a swapping function is added. Hence, instead of saving the current context into a shadow register set, an entire second set of registers is provided and during execution of an interrupt, this second set is used. Thus, an interrupt context is provided and the content of the interrupt context remains stored in the associated interrupt context registers while a "normal" context is maintained in the same way by means of the regular context registers. This type of double register set can be implemented in particular by the use of a circular buffer which uses respective pointers that wrap around a block of data to provide for the circular buffer function. As will be explained in more detail below.

FIG. 3 shows an exemplary embodiment of a circular buffer which can be used to provide context switching functionality. The circular buffer 300 may be designed to provide storage capacity for two register sets used to store the active and the inactive context. For example a context may comprise 4, 8 or 16 registers, thus, the circular buffer 300 would provide for 8, 16 or 32 memory locations or registers. The circular buffer 300 can be at least partially memory mapped into the main data memory 225. For example, the first half of circular buffer 300 may be used as the main context and the second half may be used as the interrupt context. Only one of the two contexts is "active" at any time whereas the respective other context is "inactive." Thus, certain registers of the first half of circular buffer can be memory mapped to all memory banks wherein all registers of the second half may be memory mapped only to a single, preferably the last memory bank. Thus, memory mapping of the active register set to the banks does not need to be same as memory mapping to of the inactive register set. While the active context can be partially mapped to all or a selected number of banks, all registers of the "inactive" context are memory mapped to a single memory bank, preferably the last memory bank. Certain registers of the active context may not be memory-mapped at all but rather hard wired or mapped to a specific register to perform a specific function. Thus, during operation of the microcontroller, the memory mapped registers of the active context would be accessible in all memory banks whereas other non-memory mapped registers are available only through dedicated instructions. For example, a bank select register may only be available through a specific instruction. A working register may be memory mapped or not according to various embodiments. Certain context registers may be memory mapped to all memory banks, for example a status register STATUS and/or a file select register FSR. However, all registers of an inactive context are memory mapped to at least a single 'memory location'. They do not need to be memory mapped to the same locations of the respective registers of the active context which would make those active registers not available in that memory bank. Also there is no requirement that these registers are placed all in the same bank or located in the last bank according to other embodiments.

Memory mapping according to this embodiment can be provided by means of pointers 310, 320 as shown in FIG. 3. Thus, pointer 310 points to a first register of the currently active context whereas pointer 330 points to the first register of the inactive context. Other registers may be memory mapped according to predefined relationship. Thus, memory mapping does not have to be continuous. A table may be defined to memory map each register. Such a table may also be used to define non-memory mapped registers of the active context. Similarly, all registers of the inactive context may be memory mapped by means of a table to a single memory bank. A context switch from A to B as shown in FIG. 3 causes that pointer 310' now points to the bottom half whereas pointer 330' now points to the top half of circular buffer 300. This functionality can be provided by simply adding a constant value to the respective address pointers. By wrapping around the maximum possible address for buffer 300, a circular buffer function is realized. Hence, during normal operation the context defined by the top half of buffer 300 will be selected as the active context as shown with reference symbol A on the left side of FIG. 3 whereas the context of the bottom half of buffer 300 is only memory mapped to the last bank. Upon entering an interrupt routine, the context pointers are positioned according to reference symbol B as shown on the right side of FIG. 3. Now pointer 310' points to the bottom half of buffer 300. Thus, the bottom half registers of buffer 300 are now selected as the active context. Re-entry of an interrupt routine therefore now provides for the same context as it was left by a previous execution of an interrupt routine, wherein the inactive context is fully available through the last memory bank.

FIG. 4 shows another embodiment that provides for a similar functionality. Here two buffers 410 and 420 are provided for a normal context and an interrupt context, respectively. Bidirectional multiplexers 430 and 440 are provided to memory map certain registers to various memory banks 450, of data memory 450. For example, the first I/O of multiplexer 430 may memory map certain registers of register set 410 to all memory banks $450_1 \ldots 450_n$ whereas the second I/O maps the all registers only to memory bank $450_n$. The second multiplexer 440 performs the reverse function as shown in FIG. 4. Thus, either register set 410 or register set 420 are selected as the main register set. Additional circuitry may be provided to provide connection or selection to or of non-memory mapped registers.

Figure 5:
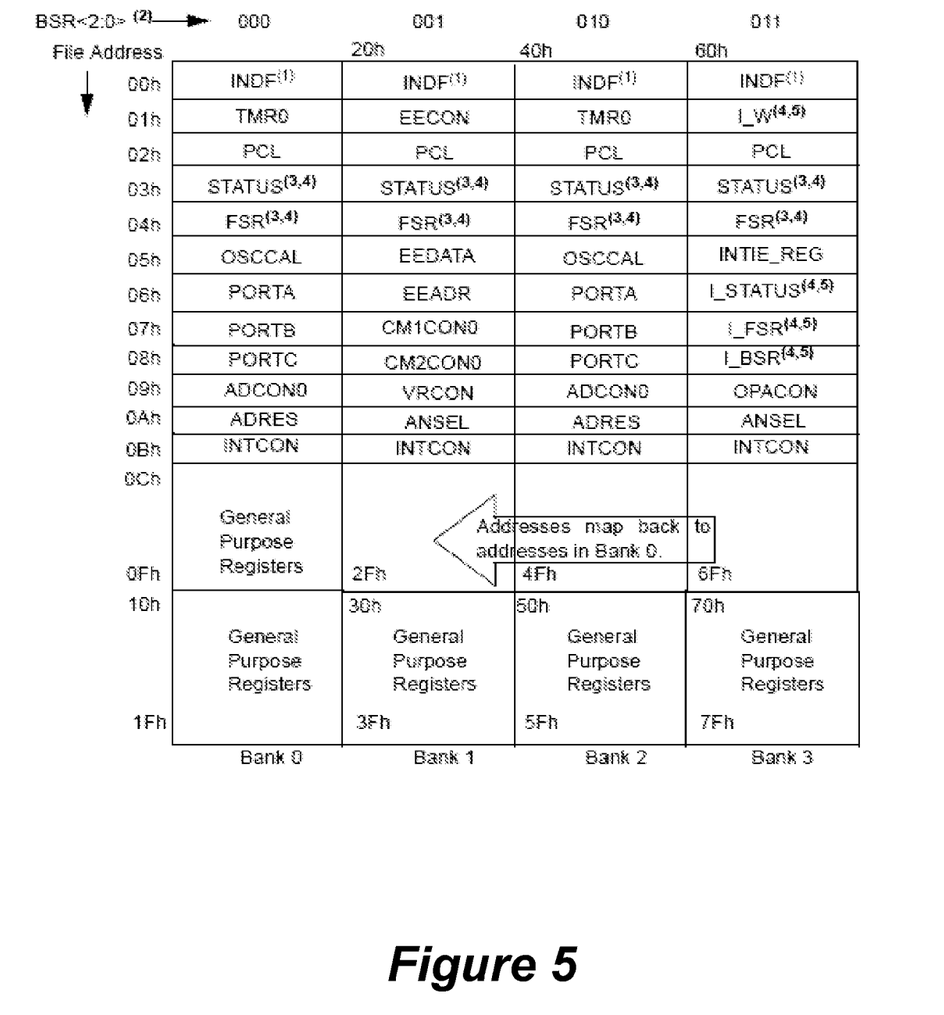
FIG. 5 shows a memory mapping according to various embodiments.

FIG. 5 shows an implementation of the memory mapping in a baseline microcontroller according to an embodiment. Here, for example, the data memory only provides memory space for four memory banks wherein each memory bank comprises 32 registers. Thus, each memory bank can be fully addressed by only 5 bits. This allows for a reduced instruction size, for example using only 12 bits. As shown in FIG. 5, a context may consist of only a limited number of selected special function registers. According to FIG. 5, a context has four registers: the working register W, the status register STATUS, the indirect address register FSR, and the bank select register BSR. As can be seen, according to this embodiment, two of the four active context registers are not memory mapped at all, namely the working register W and the bank select register BSR. The other two, the status register STATUS and the file select register FSR are memory mapped to all memory banks at address 03h and 04h, respectively. The last memory bank "011" contains the inactive context. As shown the inactive working register I_W is stored at address 01h, the inactive status register I_STATUS at address 06h, the inactive file select register at address 07h, and the inactive bank select register I_BSR at address 08h. In the embodiment of FIG. 5, registers at address 0Ch to address 0Fh are memory mapped to all memory banks whereas each bank has separate general purpose registers at memory locations 10h to 1Fh. Moreover, memory mapping of special function registers at addresses 00h to 0Bh is not the same for all banks. Only banks "000" and '010" have an identical memory mapping for those addresses. Other registers or more registers may be chosen for a context according to other embodiments.

FIGS. 6 and 7 shows a more detailed list of only the first 12 memory mapped special function registers. Again, a context consists of four registers, the working register W, the bank select register BSR, the status register STATUS, and the file select register FSR. According to this embodiment, again only two registers, STATUS and FSR of the active context are memory mapped to all memory banks at respective addresses 03h, 04h as shown in FIGS. 6 and 7 whereas four non-memory mapped registers W, TRIS, OPTION and BSR are still provided 'to all banks' as shown in the table of FIGS. 6 and 7. The inactive context is only memory mapped to the last memory bank at linearized addresses 61h, 66h, 67h, and 68h.

According to various embodiments, additional instructions can be provided for a baseline microcontroller with the enhanced interrupt functionality as explained above. For example, a Return, a Return from Interrupt, and a Move Literal to BSR instructions can be added to such a microcontroller core to further support interrupts and other context switching functionalities. According to various embodiments, context switching of important special function registers can thus be added not only for Interrupt Service Routine entrance and exit but also for other events controlled by software.

According to various embodiments, three new instructions may be added to a baseline microcontroller:

MOVLB—Move Literal to BSR Register: this instruction directly controls a bank select register by writing a constant value into it thereby forcing a bank switch. A 12-bit Opcode may use 12'h010-12'h017.

RETURN—Return from CALL: this instruction returns from a subroutine call wherein the baseline only provided RETLW which returns a byte from the last program location into the working register. A 12-bit Opcode may use 12'h01E RETFIE—Return from Interrupt: this instruction returns from an interrupt, wherein as mentioned above, conventional baseline devices did not have interrupts. A 12-bit Opcode may use 12'h01F.

Interrupt context switching is implemented according to various embodiments as follows: Second Copy (Context) of selected SFRs is used when executing from the Interrupt Service Routine. For example, the FSR, STATUS, BSR, and W Registers can be swapped on the improved microcontroller device according to various embodiments. While it is known from prior art devices such as the PIC16F1xxx line to use so-called shadow registers to save a current context and restore it upon entry and exit of a service routine, the various embodiments allow to swap a second register set that can be implemented in one of the various memory banks. Hence, a true context switch takes place in which the content of the second context register set is used instead of the main context register set upon a respective trigger. Thus, an interrupt routine may use an entire different set of values for these registers without the need to first initialize these registers. The values of for the main program are handled similarly through the swapping mechanism.

There can be two register swap trigger sources:
Vectoring on interrupt
return from interrupt instruction Each context can be triggered by its respective source. This embodiment uses two contexts. According to another embodiment, there could four; Interrupt0, Interrupt1, Interrupt2, and Main.

According to the various embodiments, an inactive context is always visible in Bank 3 of the special function registers via I_W, I_STATUS, I_FSR, and I_BSR registers as shown in FIG. 7.

Interrupt function according to various embodiments can be enabled by default. On conventional baseline devices any interrupt sources caused the device to reset. Setting the GIE bit causes the device to instead vector to address 0x004, to allow the execution of an Interrupt Service Routine (ISR).

The Return From Interrupt (RETFIE) instruction is used to return from the ISR and sets the GIE bit, enabling subsequent interrupts. While the device is executing from the ISR a secondary set of W, STATUS, FSR, and BSR registers are used by the CPU. These registers are still addressed at the same location, but hold persistent, independent values for use inside the ISR. This allows the contents of these registers to be unaffected by interrupts in main line execution. The contents of the other context's registers are visible in bank 3 of the SFR map via the I_W, I_STATUS, I_FSR, and I_BSR registers. When executing from the ISR they will show the main line context, and vice versa.

According to an embodiment, four interrupt sources may be available; timer TMR0, analog-to-digital converter ADC, comparators, and interrupt on Pin Change. Interrupts are enabled using the xxIE bits in an INTEI_REG register. Interrupt on Pin Change can be enabled using the RAWU bit of the Option Register OPTION to allow the RAIF bit to function. The comparator interrupt flag can be used if interrupt generation is enabled in the CM1CON0 and CM2CON0, Register and Register as shown in FIG. 6.

The GIE bit of INTCON enables vectoring to the interrupt service routine. When the WUR bit is set, any enabled interrupt source in sleep will cause the device to wake up and reset. This function is similar to traditional baseline operation.

Figure 8:
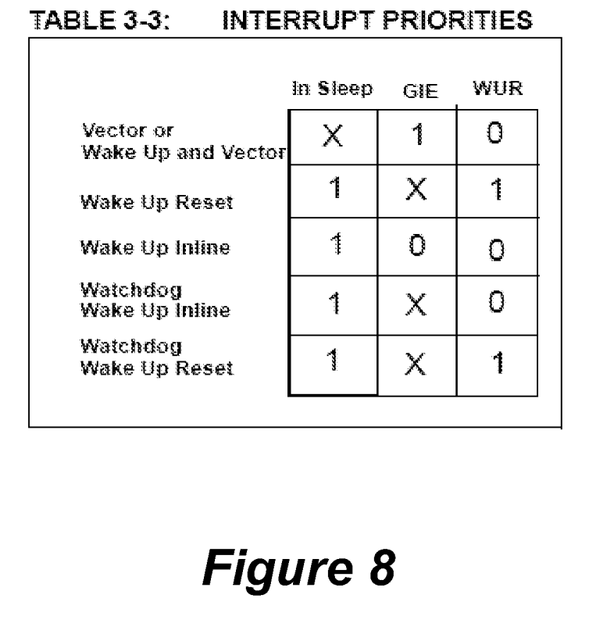
FIG. 8 shows interrupt priorities according to various embodiments.

FIG. 8 a possible implementation of different priorities according to internal programming. Here three control bits "In Sleep" indicating a low power mode, "GIE" enabling the interrupt, and "WUR" for indicating a wake up reset are provided. The table in FIG. 8 shows associated function according to different settings of these bits. Thus, either a device reset, a vectoring or continued operation can be caused according to the respective setting.

What is claimed is:

1. A microprocessor or microcontroller device comprising:
a central processing unit (CPU);
a data memory coupled with the CPU, wherein the data memory is divided into a plurality of memory banks, wherein a bank select register determines which memory bank is currently coupled with the CPU; and
a first set of special function registers and a second set of special function registers, wherein upon occurrence of a context switch either the first or the second set of special function register are selected as active context registers for the CPU and the respective other set of special function registers are selected as inactive context registers, wherein at least some of the registers of the active context registers are memory mapped to more than two memory banks of said data memory and wherein all registers of the inactive context registers are memory mapped to at least one memory location within the data memory.

2. The device according to claim 1, wherein all registers of the inactive context registers are memory mapped to only one memory bank of said plurality of memory banks.

3. The device according to claim 1, wherein at least some of the registers of the active context registers are memory mapped to all memory banks of said data memory.

4. The device according to claim 1, wherein the context register comprise a working register, a status register, a file select register for defining an indirect address and a bank select register.

5. The device according to claim 4, wherein only the status register and the file select register of the active context registers are memory mapped to all memory banks of said data memory and the working register and the bank select register are non-memory mapped registers.

6. The device according to claim 1, wherein the inactive context registers are memory mapped to the last memory bank of said data memory.

7. The device according to claim 1, further comprising an interrupt unit coupled with the CPU, wherein said context switch is induced by an interrupt.

8. The device according to claim 1, wherein said context switch is software induced.

9. The device according to claim 1, wherein the device comprises four memory banks.

10. The device according to claim 9, wherein the inactive context registers are memory mapped only into the fourth bank.

11. A method of operating a microprocessor or microcontroller device comprising a central processing unit (CPU); a data memory coupled with the CPU, wherein the data memory is divided into a plurality of memory banks; a first and second set of special function registers wherein either said first or said second set of special function registers forms an active context and the respective other set an inactive context,
the method comprising the steps of:
selecting either said first or said second set of registers as an active context and said respective other set of registers as an inactive context, wherein at least some of the registers of the active context registers are memory mapped to more than two memory banks of said data memory and wherein all registers of the inactive context registers are memory mapped to at least one memory location within said data memory;
upon occurrence of a context switch, switching between said first and second set of registers as active and inactive context, respectively.

12. The method according to claim 11, wherein all registers of the inactive context registers are memory mapped to only one memory bank of said plurality of memory banks.

13. The method according to claim 11, further comprising inducing said context switch by an interrupt.

14. The method according to claim 11, wherein said context switch is software induced.

15. The method according to claim 11, wherein the device comprises four memory banks.

16. The device according to claim 15, wherein the inactive context registers are memory mapped only into the fourth bank.

17. The method according to claim 11, wherein at least some of the registers of the active context are memory mapped to all memory banks of said data memory.

18. The method according to claim 11, wherein the context register comprise a working register, a status register, a file select register for defining an indirect address and a bank select register.

19. The method according to claim 18, wherein only the status register and the file select register of the active context registers are memory mapped to all memory banks of said data memory and the working register and the bank select register are non-memory mapped registers.

20. The method according to claim 11, wherein the inactive context registers are memory mapped to the last memory bank of said data memory.

21. The method according to claim 11, further comprising accessing the registers of the inactive context by selecting the respective memory bank through the active context and accessing the inactive context registers.

22. The method according to claim 11, generating a plurality of interrupts, wherein upon occurrence of an interrupt, a context switch takes place, wherein an interrupt routine is executed and wherein the interrupt routine uses the values stored in the selected register set during a previous execution of the interrupt routine.

* * * * *